Dec. 5, 1961  J. E. TOLLAR ET AL  3,011,214
EXTRUSION MOLDING APPARATUS
Filed April 10, 1959

INVENTORS.
James E. Tollar
Murrey O. Longstreth
BY Jerome Rudy
ATTORNEY

United States Patent Office 3,011,214
Patented Dec. 5, 1961

3,011,214
EXTRUSION MOLDING APPARATUS
James E. Tollar and Murrey O. Longstreth, Midland, Mich., assignors to The Dow Chemical Company, Midland, Mich., a corporation of Delaware
Filed Apr. 10, 1959, Ser. No. 805,495
7 Claims. (Cl. 18—30)

This invention relates to an apparatus and method for the molding of polymeric materials. It more particularly relates to an apparatus for an extrusion molding of polymeric materials supplied to the mold in a molten state from a source having a relatively low pressure.

The term "extrusion molding" is used to refer to the molding of an article by extruding a molten polymeric substance into a die or mold having an inlet and outlet port, thus, having the molten material flow into and through the mold.

Molding of polymeric substances generally has been done by compression molding or injection molding. Each of these techniques requires relatively high pressures and are intermittent in nature.

In injection molding, molten polymeric material is supplied to a mold cavity under high pressure. The mold usually is maintained at a temperature below the softening point of the material being handled. The molten material in the mold is generally cooled by the passage of water through suitable passageways in or about the mold. An appreciable time must elapse between filling of the cavity, solidification of the polymer, and final ejection of the finished piece from the machine. Thus, the cooling cycle becomes an important obstacle in obtaining high production rates from this complex and expensive machinery.

Compression molding requires usually a press capable of producing high pressures and requires mating dies which must also be alternately heated and cooled. In general, the compression molding operation is relatively slow and inefficient, since the material being fed to the press must either be pre-heated and softened, or heated between the dies to effect melting in the case of thermoplastic resins or curing in the case of thermosetting resins.

It would be advantageous to have available a method and apparatus for molding articles which would eliminate the necessity of tying-up complex and expensive equipment during the cooling cycle. It would also be advantageous if such equipment could be operated from a low pressure source of molten polymer or prepolymer. A further advantage would result if the molding cycle could be reduced to the time required to fill a mold and eliminate entirely the cooling period. It would be most advantageous to eliminate the requirement of cooling a polymer after polymerization, forming it into granules or powders, then (at a later time) reheating the powders to form a molten mass and molding.

These and other advantageous results and purposive benefits may be achieved with the apparatus in accordance with the present invention, which comprises a hollow housing defining a passageway having mold inlet and outlet ports and polymer inlet and outlet ports with a second passageway therebetween. In combination and cooperation with this hollow housing, there is provided a mold adapted to slide within said mold passageway, said mold having filling and discharge ports and being simultaneously alignable with said polymer inlet and outlet ports. Thus, by providing a constant flow of molten polymeric material to the polymer inlet port of the housing and aligning the mold filling port, the polymeric material is forced to enter and fill the mold. The material then passes out through the discharge port of the mold which is in alignment with the polymer outlet of the housing. A similar mold is forced into the mold passageway displacing the first mold and, on alignment of the second mold of the ports in the housing, it is filled. In this way, by providing a plurality of molds, rapid filling and displacement thereof from the polymer source in a relatively short period of time may be readily accomplished. The displaced molds, after being cooled and emptied of the finished part, may again be inserted in the mold passageway to be filled.

Further features and advantages of the invention will be more apparent in the following description and specification taken in connection with the drawings wherein.

Figure 1:
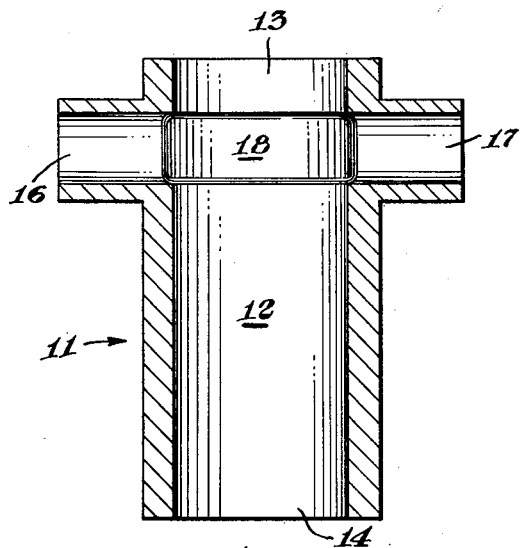
FIGURE 1 represents a cross-sectional view of a hollow mold housing.

There is shown in FIGURE 1 a housing 11 defining a mold passageway 12 having a mold inlet port 13 and a mold outlet port 14. The housing 11 is equipped with a polymer inlet port 16 and a polymer outlet port 17 having therebetween a generally annular inwardly facing groove or polymer passageway 18.

Figure 2:
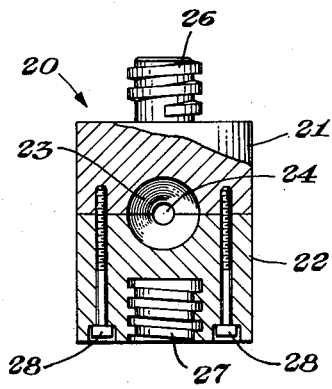
FIGURE 2 shows a cross-sectional view of a mold.

FIGURE 2 illustrates a cross-sectional view of a mold generally indicated by the reference numeral 20. The mold 20 consists of two major parts, one of these is the male member 21, and the other the female member 22. The members 21 and 22 define a mold cavity 23 having a polymer inlet port 24 and a polymer outlet port (not shown). The male member has a threaded mold-engaging portion 26 which is adapted to mate with the female threaded portion 27 of a similar female mold member. The two mold members 21 and 22 are held together by cap screws 28.

Figure 3:
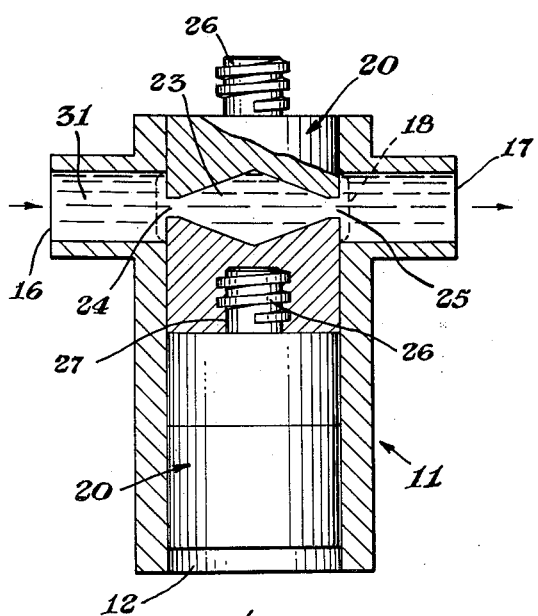
FIGURE 3 illustrates a cross-sectional view of two molds within the hollow housing, one of which is in the process of being filled with polymeric material.

In FIGURE 3, the apparatus is illustrated in operation. Within the passageway 12 of the housing 11 are located two molds 20. The upper mold is illustrated in cross-section. Polymeric material, designated by the numeral 31, enters through the housing port 16, flows through the annular groove 18, and also into the polymer mold port 24 to fill the cavity 23. It leaves the cavity 23 through the mold discharge port 25. The polymer flowing from the annular groove 18 combines with the material being discharged from the port 25 and leaves the housing through the port 17.

Figure 4:
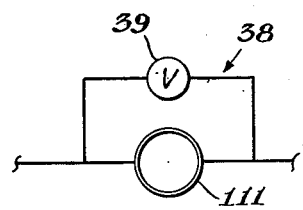
FIGURE 4 illustrates an alternative embodiment of the invention employing an external polymer passageway.

In FIGURE 4 is schematically illustrated an alternative form of the invention, wherein a housing 111 is employed which is formed without the annular groove 18 shown in FIGURE 1. In this embodiment of the invention, a by-pass, generally indicated by the reference numeral 38, is provided external to the housing 111. A valve 39 is provided in by-pass 38 to provide a means of regulating pressure drop appearing across the apparatus. However, other restrictive means may be employed to accomplish a like result.

The apparatus of the invention is particularly adapted for the molding of thermoplastic resins having relatively high heat stability such as polystyrene, polyethylene, polypropylene, and the like. Generally, a suitable stream of polymer may be obtained from a conventional extruder wherein granular material is fed to the extruder, heated, and discharged through the die into polymer inlet port or channel 16. Excess material discharged through the port 17 may be recycled through the extruder and used again. The apparatus is most advantageously employed in conjunction and cooperation with a continuous polymerizing unit, whereby the material discharging from the unit will enter the molding apparatus, fill the molds 20, and the material issued from the discharge port 17 be pumped back again recycled through the polymer supply system.

In operation, molds 20 are fed into mold inlet port 13 of the mold passageway 12 as rapidly as the molds 20 can be filled and removed.

Frequently, it is advantageous to provide an elongated housing adapted to receive more than two molds. In such a case, the entering mold may be pre-heated before contacting the polymer stream and molds that have been filled may then be cooled prior to removal from the apparatus. In this way, heating, cooling and filling of the molds may be accomplished in this single passageway by applying suitable heating or cooling means at appropriate points along the housing.

The annular groove 18 provides an alternate path for the polymeric material 31 when flowing through apparatus. In moving a fresh mold 20 into position, this alternate path provides the only means of polymer exit from entry port 16. This prevents build-up in back pressure which would result in closure of port 16 when the mold 20 entry and exit ports (24 and 25) are not aligned with the corresponding housing inlet and outlet ports (16 and 17). The annular groove 18 provides a convenient means of polymer by-pass, although it may readily be replaced with a suitable external channel. The threaded mold engaging means (26 and 27) that have been provided are shown as having threaded connections. It is desirable that these threads should be relatively free-fitting in order to avoid binding in the event that they accidentally become contaminated with polymeric material.

It is particularly advantageous to employ an annular passageway 18 if a representative sample of the polymer 31 is to be obtained in the mold 20. Employing the annular passageway 18 permits a minimum of retention of polymer 31 within the apparatus by providing a relatively streamline flow path. Such considerations are critical when polymeric material subject to thermal degradation under molding conditions is employed.

Other suitable means may be provided, but it is generally desirable that the mold-engaging means of a positive engaging type be used in order to facilitate removal of the molds 20 should binding occur in channel 12 due to the presence of foreign, non-fusible material.

Positive engagement means are also desirable to facilitate alignment of the mold ports 25 and 26 with the housing ports 16 and 17. However, by choosing a suitable cross-sectional shape for the molds and housing, rotation of the mold 20 may be eliminated.

In FIGURE 2, cap screws 28 have been illustrated as a fastening means for the two halves of the mold 21 and 22. In molding of more complex articles, a mold having more than two parts may be desirable and other fastening means may be employed.

When filling the mold, it is generally desirable to position the mold inlet port 24 below the level of the mold outlet port 25, as this facilitates the discharge of gas from cavity 23. Frequently, however, cavity 23 is evacuated prior to filling, thus eliminating the occurrence of air bubbles within the mold.

The apparatus of the invention has been successfully employed to mold articles when coupled to a source of molten polystyrene.

Molds 20 are readily and rapidly inserted into the passageway 12 and, in general, the molding cycle closely approximates the time required to fill the mold 20, thus eliminating the need of a cooling cycle which stops the entire production of a molding machine.

The apparatus is particularly suitable for employment in the production of articles having a relatively simple form.

As is apparent, the apparatus is susceptible of being embodied with various alterations and modifications from that which has been described in the preceding description and specification. For this reason, it is to be fully understood that all of the foregoing is merely intended to be illustrative and is not to be construed or interpreted as being restrictive or otherwise limiting of the present invention excepting as it is set forth and defined in the appended claims.

What is claimed is:

1. In combination in a molding apparatus, a hollow housing defining a mold passageway having mold inlet and mold outlet ports and polymer inlet and outlet ports; a mold adapted to slide within said mold passageway, said mold having filling and discharge ports simultaneously alignable with said polymer inlet and outlet ports in said housing, and polymer bypass means external to said mold in communication with said polymer inlet and outlet ports.

2. In combination in a molding apparatus, a hollow housing defining a mold passageway having mold inlet and mold outlet ports, and polymer inlet and outlet ports having a generally annular inwardly facing groove therebetween; and a mold adapted to slide within said mold passageway, said mold having filling and discharge ports simultaneously alignable with said polymer inlet and outlet ports in said housing.

3. A molding apparatus as in claim 2, wherein the mold is equipped with a male mold-engaging means and female mold-engaging means that are generally normal to said mold filling and discharge ports.

4. A molding apparatus as in claim 2, wherein said mold is composed of at least two parts, each part defining a portion of the mold cavity.

5. In combination in a molding apparatus, a generally cylindrical hollow housing defining a generally cylindrical mold passageway having a mold inlet and mold outlet end, said housing defining polymer inlet and outlet ports generally normal to axis of said passageway and an inwardly facing generally annular groove therebetween; and a mold adapted to slide within said mold passageway, said mold having filling and discharge ports simultaneously alignable with said polymer inlet and outlet ports, said mold being equipped with male threaded mold-engaging means and female threaded mold-engaging means, which means are aligned oppositely and coaxially with mold passageway engaging surface, said mold comprising at least two separable parts, each part defining a portion of a mold cavity.

6. A method of molding plastic material comprising interposing into a continually flowing stream of molten thermoplastic material a mold having inlet and outlet ports, filling said mold with said thermoplastic material, by passing a portion of said stream around said mold displacing said mold from said stream, and hardening said thermoplastic material within said mold.

7. A method of molding plastic materials comprising interposing into a continuously flowing stream of molten thermoplastic material a mold having inlet and outlet ports, filling said mold with said thermoplastic material, by passing at least a portion of said stream around said mold displacing said mold from said stream with a similar mold and hardening the polymer within said mold, displacing said similar mold with a second similar mold and repeatedly displacing molds and hardening said polymer to produce a plurality of molded parts.

References Cited in the file of this patent
UNITED STATES PATENTS

| | | |
|---|---|---|
| 580,021 | Trusler | Apr. 6, 1897 |
| 1,731,006 | Goodwin | Oct. 8, 1929 |
| 2,873,491 | Brennan | Feb. 17, 1959 |